United States Patent
Kilbey et al.

(10) Patent No.: US 10,438,619 B1
(45) Date of Patent: Oct. 8, 2019

(54) POSITION ERROR SIGNAL TESTING USING OUTER EDGE WRAPS

(71) Applicant: International Business Machines Corporation, Armonk, NY (US)

(72) Inventors: Michael E. Kilbey, San Jose, CA (US); Guillermo F. Paniagua, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/168,155

(22) Filed: Oct. 23, 2018

(51) Int. Cl.
| | |
|---|---|
| *G11B 5/55* | (2006.01) |
| *G11B 20/12* | (2006.01) |
| *G11B 5/584* | (2006.01) |
| *G11B 15/60* | (2006.01) |
| *G06F 3/06* | (2006.01) |

(52) U.S. Cl.
CPC .......... *G11B 5/584* (2013.01); *G06F 3/0607* (2013.01); *G06F 3/0661* (2013.01); *G06F 3/0682* (2013.01); *G11B 15/602* (2013.01)

(58) Field of Classification Search
CPC ........ G11B 27/36; G11B 20/12; G11B 20/18; G11B 15/46; G11B 5/5539; G11B 20/20; G11B 5/584; G11B 5/5504; G11B 20/82; G11B 20/1876
USPC .......... 360/25, 31, 48, 53, 73.04, 76, 77.12, 360/78.09
See application file for complete search history.

(56) References Cited

U.S. PATENT DOCUMENTS

| | | |
|---|---|---|
| 6,754,033 B1 | 6/2004 | Argumedo et al. |
| 6,963,467 B2 | 11/2005 | Bui et al. |
| 8,861,121 B2 | 10/2014 | Underkofler |
| 9,251,828 B2 * | 2/2016 | Cherubini .............. G11B 5/584 |

OTHER PUBLICATIONS

Kilbey et al., U.S. Appl. No. 16/450,844, dated Jun. 24, 2019.

\* cited by examiner

*Primary Examiner* — Nabil Z Hindi
(74) *Attorney, Agent, or Firm* — Zilka-Kotab, PC-IBM

(57) ABSTRACT

A tape drive-implemented method, according to one embodiment, includes: determining formatting information which corresponds to a magnetic tape loaded in the tape drive, and using the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is also performed for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

20 Claims, 11 Drawing Sheets

POSITION ERROR SIGNAL TESTING USING OUTER EDGE WRAPS

BACKGROUND

The present invention relates to magnetic tape storage systems, and more specifically, to position error signal (PES) testing.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which runs about parallel to a longitudinal axis of the tape. Data is recorded in the regions of tape located between pairs of the servo bands. In read/write heads of linear tape-open (LTO) and IBM Enterprise tape drives, two servo readers are normally available per head module, from which longitudinal position (LPOS) information as well as a PES may be derived. Effective detection of the TBS patterns is achieved by a synchronous servo channel employing a matched-filter interpolator/correlator, which ensures desirable filtering of the servo reader signal.

With the increase in track density that is envisioned for future tape media and tape drives, accurately controlling the lateral position of the head and/or skew of the head with respect to tape by using feedback generated by reading the TBS patterns becomes increasingly difficult. Conventional servo based implementations may not be sufficiently accurate to ensure adequate positioning of the data readers and writers that move along data tracks. Furthermore, the repetition rate of the head lateral position estimates may be too low to ensure proper track-following operation as tape velocity varies during use. The repetition rate of the head lateral position estimates may additionally be unable to support future actuators with larger bandwidths.

SUMMARY

A tape drive-implemented method, according to one embodiment, includes: determining formatting information which corresponds to a magnetic tape loaded in the tape drive, and using the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is also performed for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: determining, by the processor, formatting information which corresponds to a magnetic tape loaded in a tape drive; and using, by the processor, the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is performed, by the processor, for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

A system, according to yet another embodiment, includes: a processor, and logic integrated with and/or executable by the processor. The logic is configured to cause the processor to: determine, by the processor, formatting information which corresponds to a magnetic tape loaded in a tape drive; and use, by the processor, the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is also performed, by the processor, for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

Other aspects and embodiments of the present invention will become apparent from the following detailed description, which, when taken in conjunction with the drawings, illustrate by way of example the principles of the invention.

DETAILED DESCRIPTION

Figure 1:
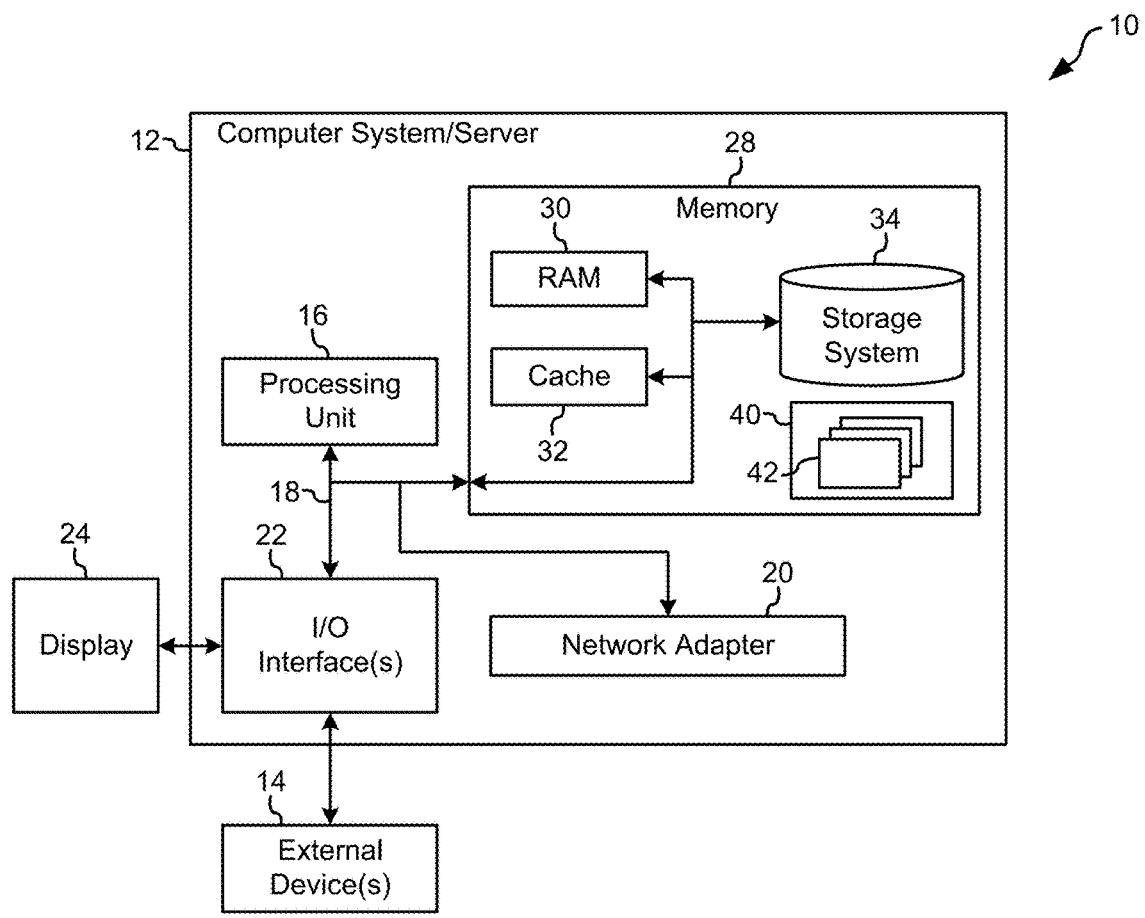
FIG. 1 is a representational view of a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for efficiently identifying faulty components in a tape drive, assist in repairing and/or replacing the one or more faulty components, and ensure desirable performance of the tape drive as a whole. Accordingly, some of the embodiments included herein are able to ensure guide bearing functionality which significantly improves yield, improves product quality, reduces testing time, etc., while also improving the quality of tape drives which are manufactured, e.g., as will be described in further detail below.

In one general embodiment, a tape drive-implemented method includes: determining formatting information which corresponds to a magnetic tape loaded in the tape drive, and using the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is also performed for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: determining, by the processor, formatting information which corresponds to a magnetic tape loaded in a tape drive; and using, by the processor, the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is performed, by the processor, for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

In yet another general embodiment, a system includes: a processor, and logic integrated with and/or executable by the processor. The logic is configured to cause the processor to: determine, by the processor, formatting information which corresponds to a magnetic tape loaded in a tape drive; and use, by the processor, the formatting information to identify wraps on the magnetic tape. Identifying wraps on the magnetic tape includes: identifying an outermost wrap on the magnetic tape on a first side of the magnetic tape, and identifying an outermost wrap on the magnetic tape on a second side of the magnetic tape. A procedure is also performed, by the processor, for each of the wraps identified using the formatting information. Performing the procedure for a given one of the wraps includes: sending one or more instructions to position a magnetic head of the tape drive over the given wrap, sending one or more instructions to move the magnetic tape over the magnetic head, and collecting PES information which corresponds to the given wrap.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processing unit 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disc drive for reading from or writing to a removable, non-volatile optical disc such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2A:
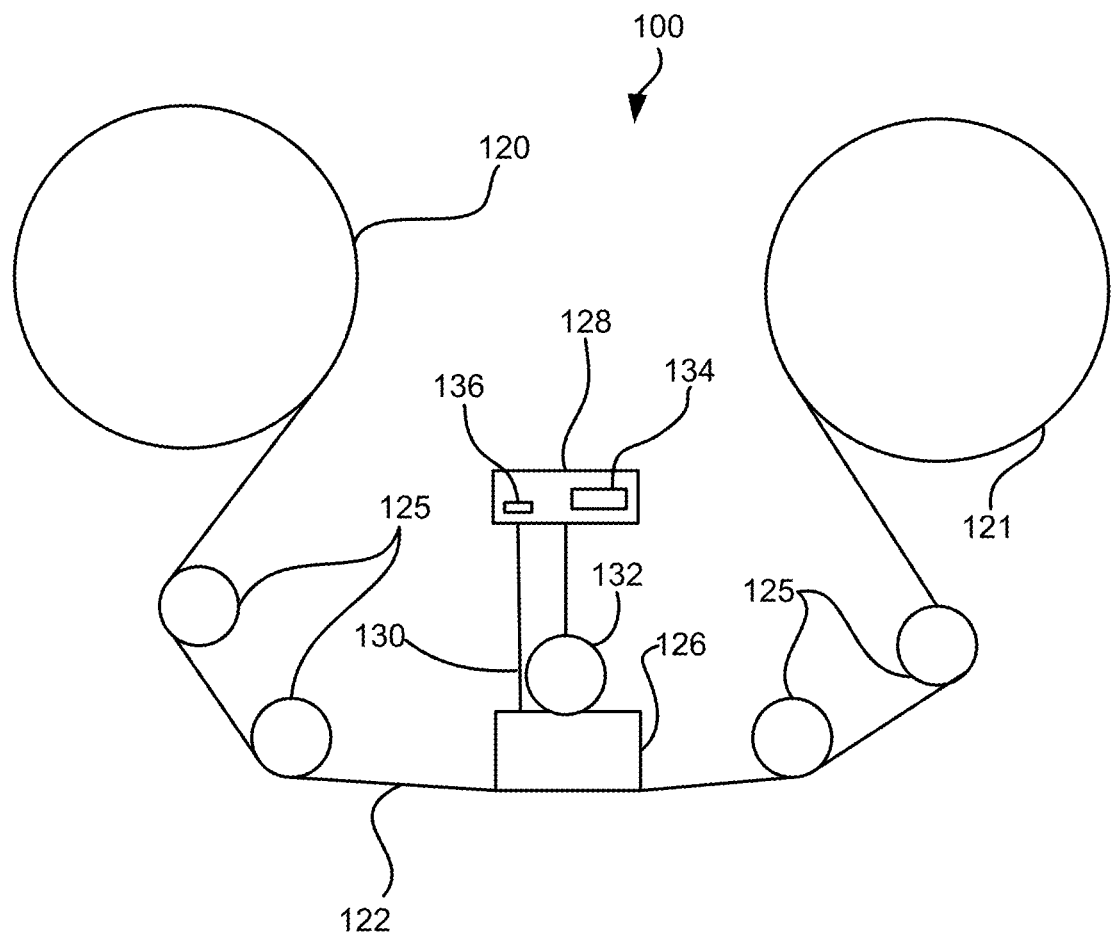
FIG. 2A is a representational view of a simplified tape drive of a tape-based data storage system, according to one embodiment.

Looking to FIG. 2A, a tape supply cartridge 120 and a take-up reel 121 are provided to support a tape 122. One or more of the reels may form part of a removable cartridge and are not necessarily part of the tape drive 100. A tape drive, e.g., such as that illustrated in FIG. 2A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 2B:
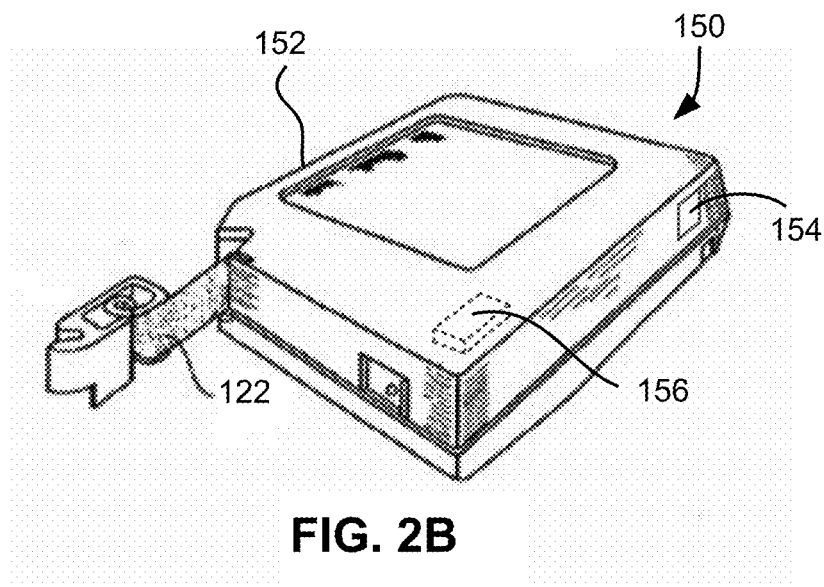
FIG. 2B is a schematic diagram of a tape cartridge according to one embodiment.

FIG. 2B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 2B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150.

The nonvolatile memory is accessible by the tape drive and the tape operating software (the driver software), and/or another device.

Figure 3:
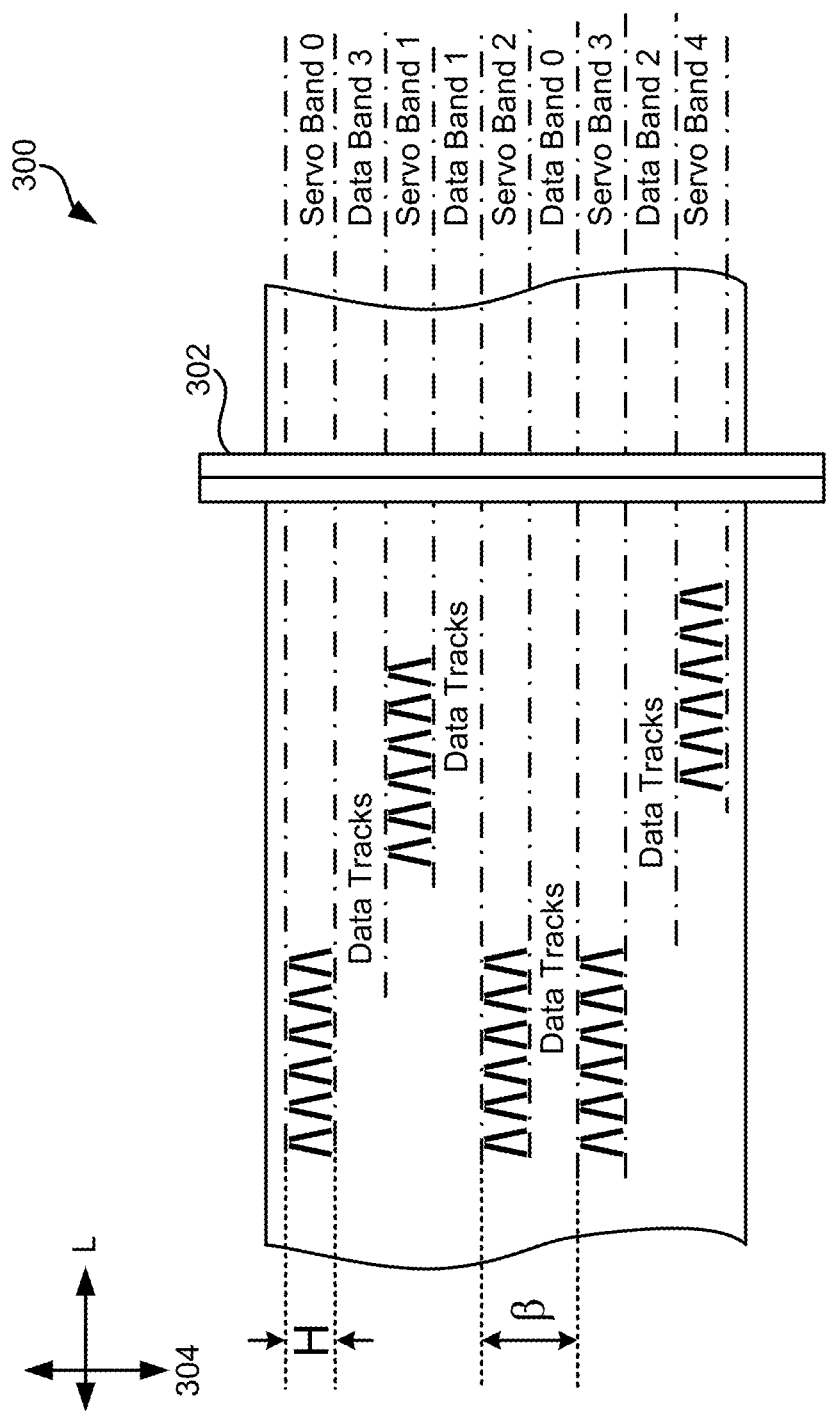
FIG. 3 is a representational view of a tape layout, according to one embodiment.

Referring momentarily to FIG. 3, an illustrative tape layout is depicted in accordance with one embodiment. As shown, tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the tape 300. According to an example, the height H of each of the servo bands may be about 186 microns according to the LTO format. Moreover, a pitch β between the servo bands as shown may be about 2859 microns, again according to the LTO format.

An exemplary tape head 302 is also shown as having two modules and as being positioned over a portion of the tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the PES, thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figure 4A:
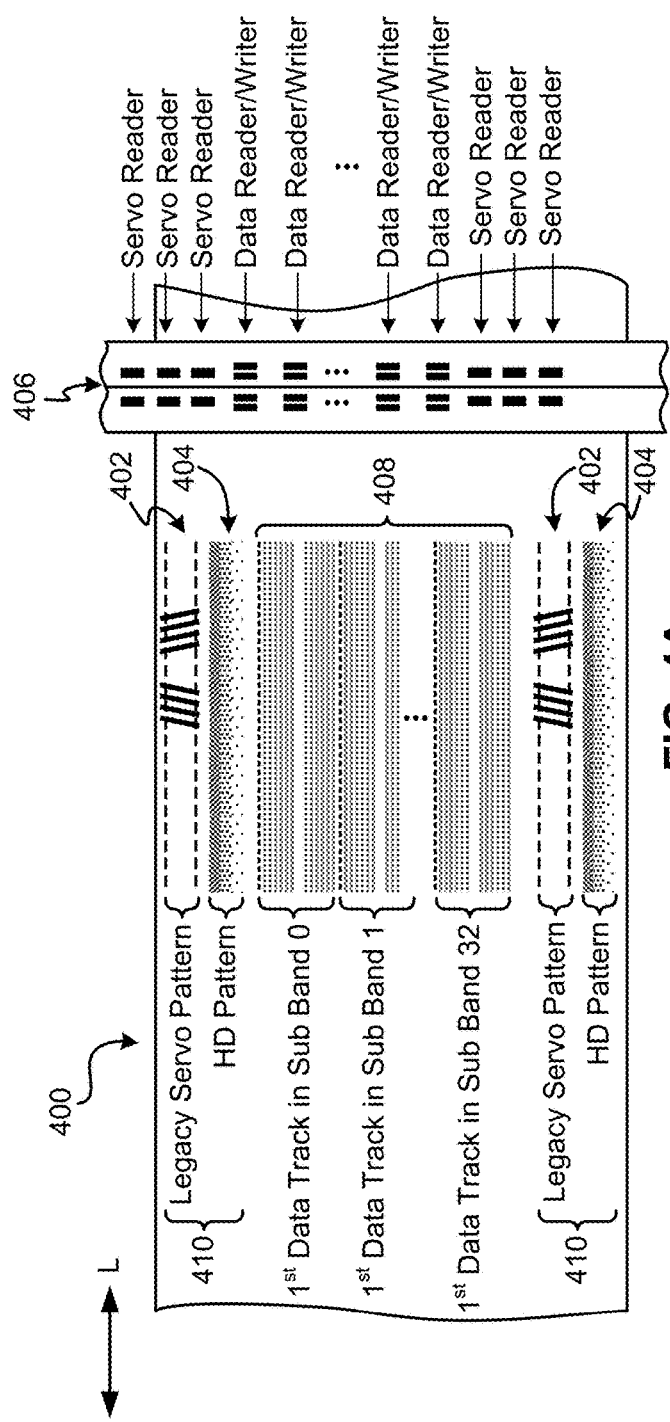
FIG. 4A is a representational view of a hybrid servo pattern written in a dedicated area of a tape medium, according to one embodiment.
Figure 5C:
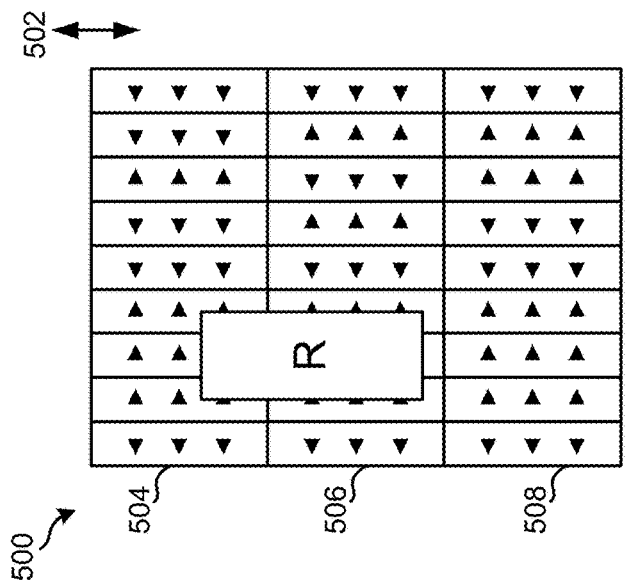
FIG. 5C is a representational view of a HD pattern, according to one embodiment.

A hybrid servo pattern 410, which includes a standard TBS pattern 402 written in a servo band, as well as an HD pattern 404 that is written in a HD band (e.g., dedicated area) of the tape medium 408 is shown in FIG. 4A. Moreover, each HD pattern 404 includes a number of HD tracks, each of the HD tracks having a respective periodic waveform, e.g., as seen in FIGS. 5A, 5C and 11A below. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Figure 4B:
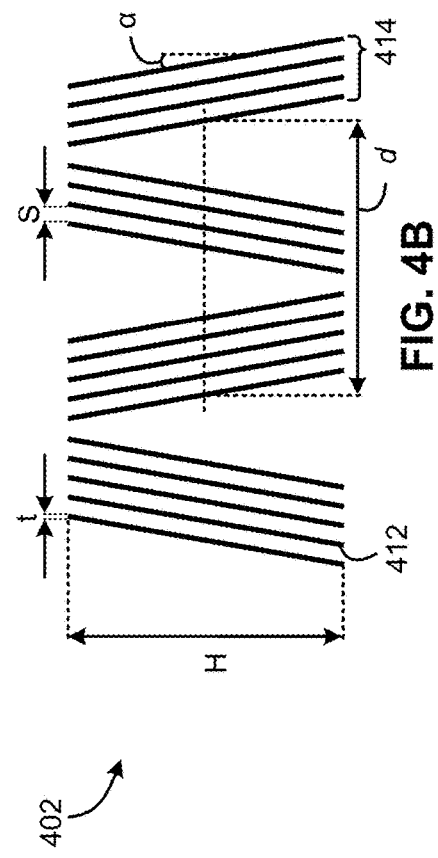
FIG. 4B is a partial detailed view of a TBS pattern, according to one embodiment.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. Accordingly, the depicted TBS frame has four servo bursts 414 and two servo sub-frames. In the present embodiment, the servo bursts 414 included in the left servo sub-frame each have five servo stripes 412, while the servo bursts 414 included in the right servo sub-frame each have four servo stripes 412. The servo stripes 412 included in a given servo burst 414 are oriented such that they have a same azimuthal slope represented by angle $\alpha$. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. According to an exemplary approach, which is in no way intended to limit the invention, the height H may be about 186 µm, and the angle $\alpha$ may be about 6°, while the thickness t is about 2.1 µm. Moreover, the spacing S between each of the servo stripes 412 and/or the distance d between servo bursts 414 having the same azimuthal slope may vary depending on the desired embodiment. According to an exemplary approach, which is in no way intended to limit the invention, the spacing S may be about 5 µm, while the distance d is about 100 µm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 4C:
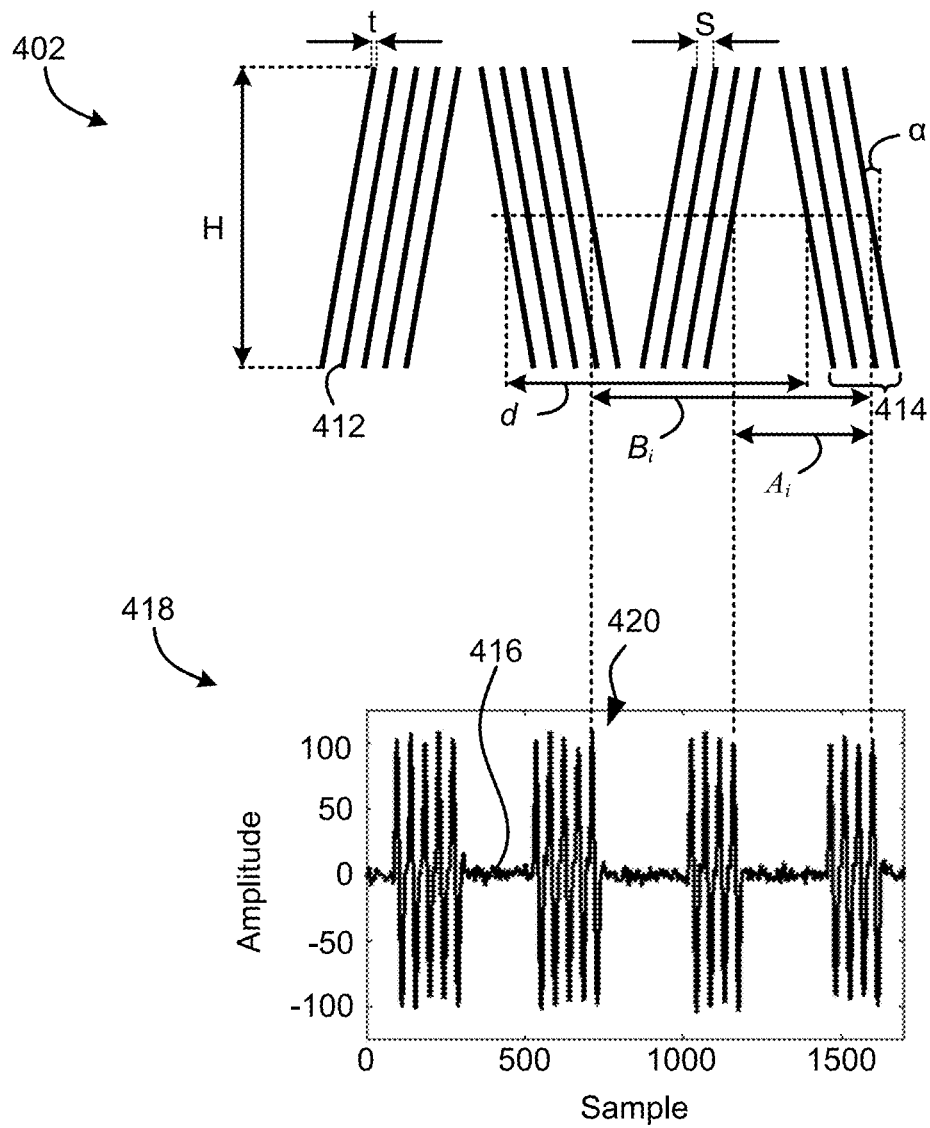
FIG. 4C is a graph plotting sample vs. amplitude of the TBS pattern of FIG. 4B, according to one embodiment.

FIG. 4C illustrates a graph 418 plotting sample vs. amplitude of the TBS pattern 402 of FIG. 4B, detected as a servo readback signal 416 during readback. A servo channel may decode the readback signal that is received from a servo reader of a magnetic tape head reading the TBS pattern 402. For example, when a servo stripe 412 of the TBS pattern 402 passes across the servo sensor, a double pulse portion 420 (having a positive peak and a negative peak) of the readback signal 416 is generated, e.g., for purposes of an example see lateral dashed lines indicating how double pulse portions of the readback signal 416 correspond to servo stripe read locations. Accordingly, two or more of such double pulse portions and timing associated therewith may be used in calculating lateral position (y-position) estimates.

In one approach, the servo channel may provide y-position estimates to a track-following control system, e.g., where such y-position estimates are calculated using Equation 1 below.

$$\hat{y} = \frac{d}{2\tan(\alpha)}\left(\frac{1}{2} - \frac{\sum A_i}{\sum B_i}\right) \quad \text{Equation 1}$$

As shown above, the lateral y-position estimate $\hat{y}$ of Equation 1 may incorporate: the distance d, the azimuthal slope (angle $\alpha$) of the servo stripes 412, a measured time $B_i$ between pairs of corresponding servo stripes with the same azimuth angle (e.g., parallel stripes //, or \\) from two different sub-frames, and a measured time $A_i$ between pairs of corresponding servo stripes with opposite azimuth angle (e.g., stripes /\) from the same sub-frame.

For example, in the 5-5-4-4 pattern of FIG. 4C, four measurements $A_i$, i=0, 1, 2, 3 and four measurements of $B_i$, i=0, 1, 2, 3 are performed per servo sub-frame of the TBS pattern 402 of FIG. 4B. In some approaches, the distance d is may be referred to as the "sub-frame length."

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled IV) spans wider in the cross-track direction 502 than a single track, such that at least two tones/frequencies are detected under any reading conditions at a given time when the servo reader R is overlapped with the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 µm to about 150 µm, such as about 60 µm, about 75 µm, about 100 µm, etc., depending on the approach. Moreover, the symbol length may be in a range from about 0.5 µm to about 3.0 µm, e.g., such as about 1.0 µm, about 1.5 µm, about 2.0 µm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Figure 5D:
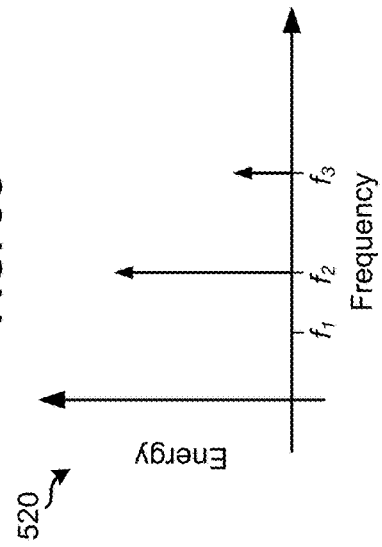
FIG. 5D is a graph plotting readback energy vs. frequency for the reader in FIG. 5C.
Figure 5A:
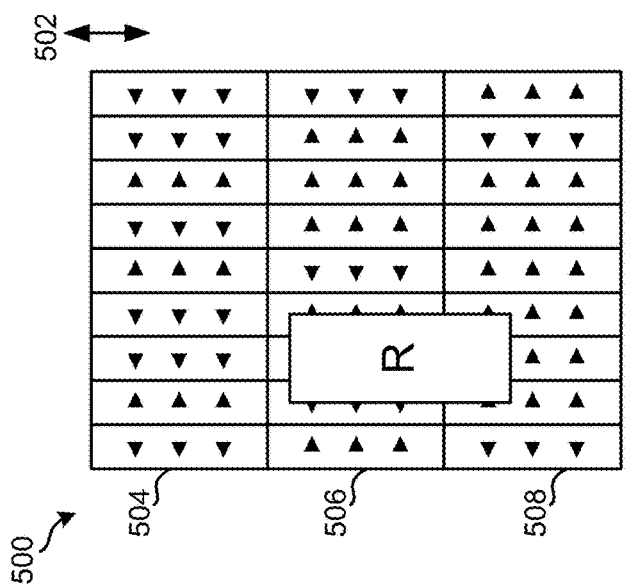
FIG. 5A is a representational view of a High Density (HD) pattern, according to one embodiment.
Figure 5B:
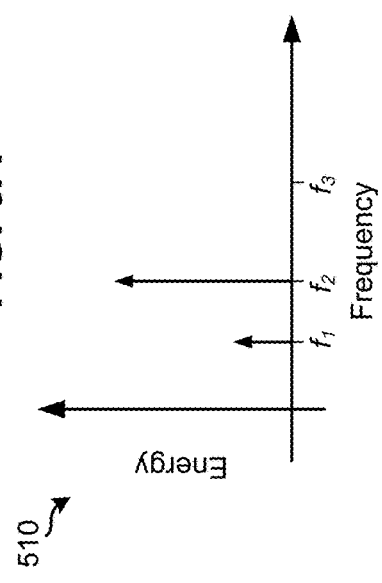
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
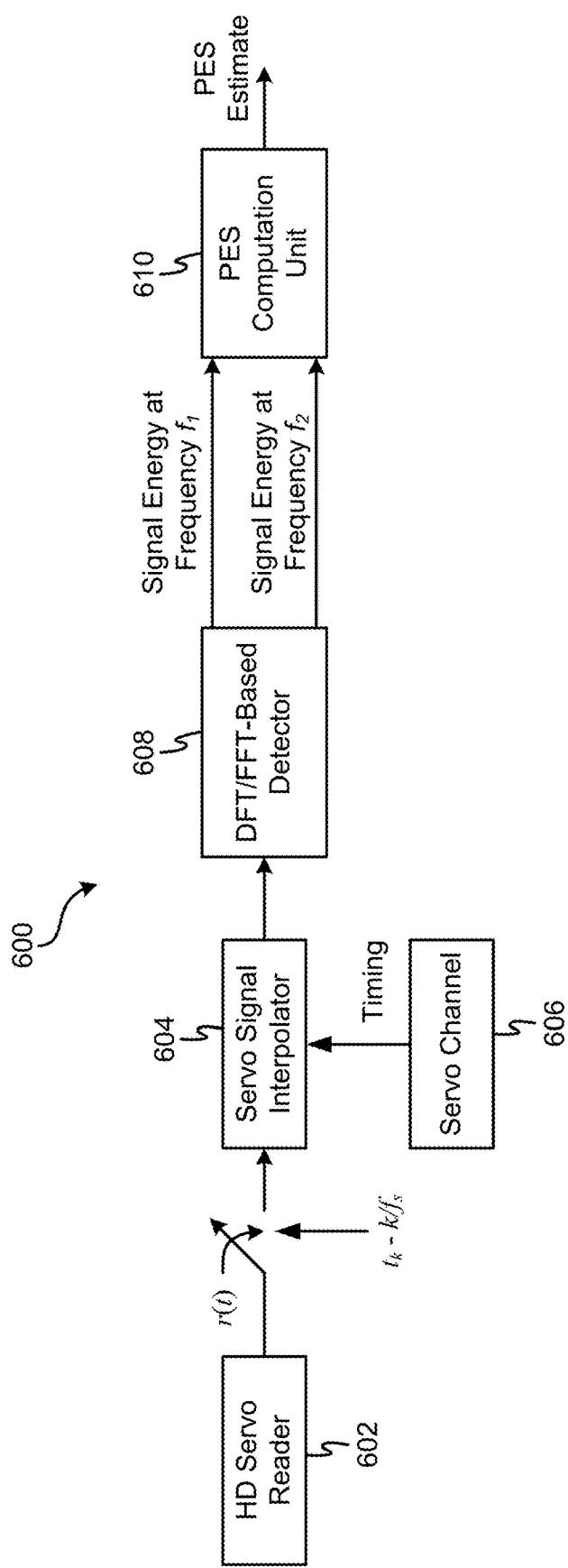
FIG. 6 is a block diagram of a detector for HD patterns, according to one embodiment.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
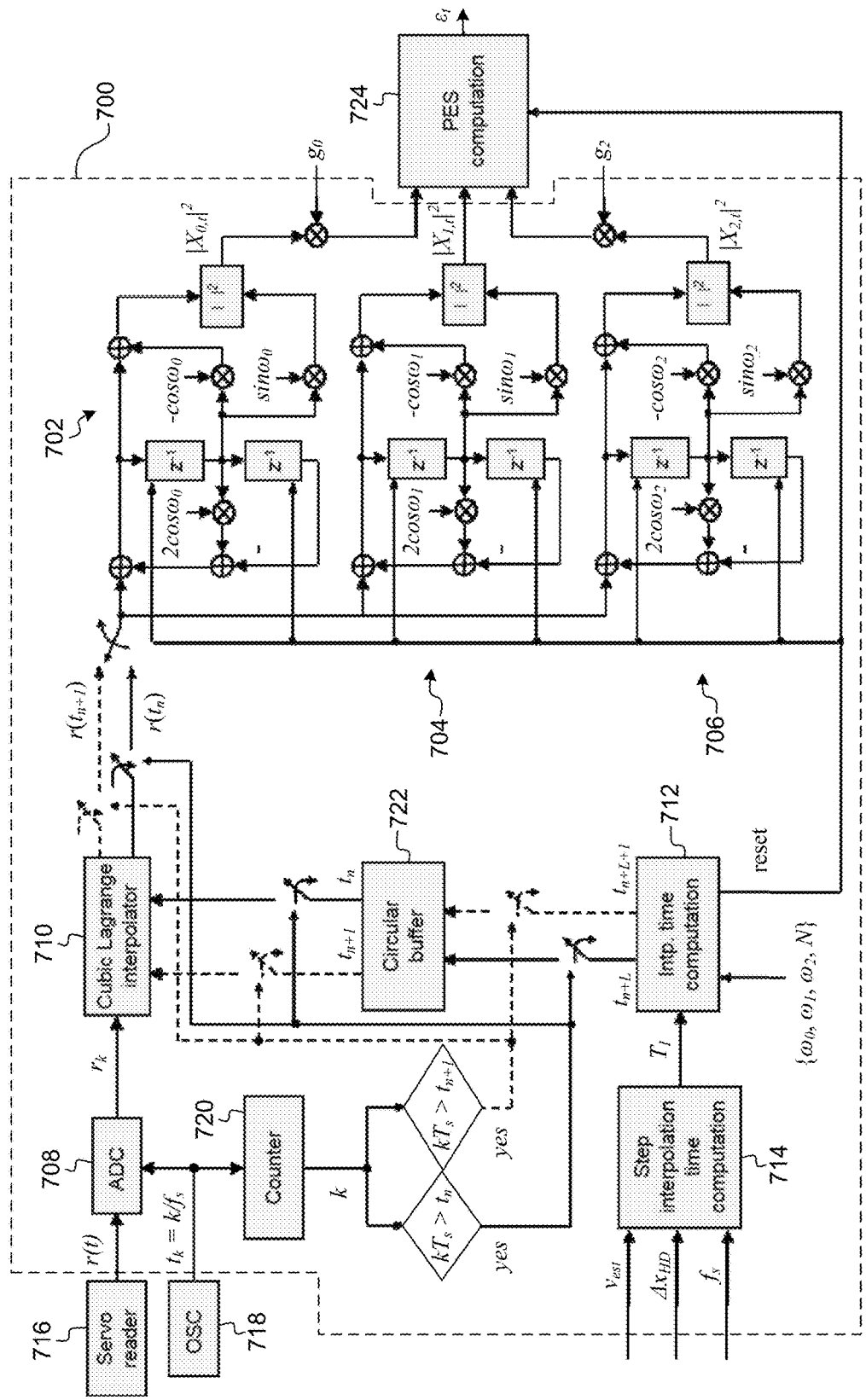
FIG. 7 is a block diagram of a detector for HD patterns, according to one embodiment.

Now referring to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the analog-to-digital converter (ADC) 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover the frequency $f_s$ of the clock 718 may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to $\Delta x_{HD}$, independently of the tape velocity. $\Delta x_{HD}$ is preferably selected such that the condition $T/\Delta x_{HD}=K$ is satisfied independently of the tape velocity, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_1$ seconds, where $T_1$ denotes the time interval that it takes for the tape to travel over a distance equal to the step interpolation distance $\Delta x_{HD}$. The estimation of the time interval $T_1$ is performed by a step interpolation time computation unit 714, which computes $T_1 = \Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_1/T_s$, where $T_s = 1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i = 2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i = 2\pi f_i$ from which the coefficients of the digital filters 702, 704, 706 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

Multiplication of the three energy estimates by gain factors $g_i$, for i=0, 1, 2, is provided to compensate for the different attenuations that the readback HD servo signal may experience at different frequencies, where the normalization $g_1 = 1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate ($\varepsilon_t$) at given time t.

Other components of the HD detector 700 may operate as would be known to one of skill in the art, and are omitted here for the sake of clarity of the described embodiments.

As previously mentioned, as track densities continue to increase, accurately controlling the lateral position and/or skew of the magnetic head with respect to the magnetic tape becomes increasingly difficult. Moreover, any imperfections in the magnetic head and/or a tape drive in which the magnetic head is positioned are amplified as these track densities increase. For instance, imperfections in the guides which are used to guide the magnetic tape over a tape head undesirably cause the magnetic tape to move unexpectedly and unnaturally, thereby increasing the PES experienced when reading from and/or writing to the magnetic tape. As a result, conventional servo based implementations have been unable to accurately ensure adequate positioning of the data readers and writers with respect to data tracks on the magnetic tape.

In sharp contrast, various ones of the embodiments described herein are able to test tape drives and the components included therein for faults in a manner which is significantly more efficient and accurate than conventional processes. For instance, looking to FIG. 8A, a flowchart of a method 800 is shown according to one embodiment. The method 800 may be performed in accordance with the present invention in any of the environments depicted in FIGS. 1-7, among others, in various embodiments. Of course, more or less operations than those specifically described in FIG. 8A may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, a computer, etc., or some other device having one or more processors therein. Thus, in some embodiments, method 800 may be a computer-implemented method. In such embodiments, the computer used to implement the method may include the tape drive itself or a portion thereof such as the controller, the tape, an external host, a server, etc., as a head tape integration operation. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

Figure 8A:
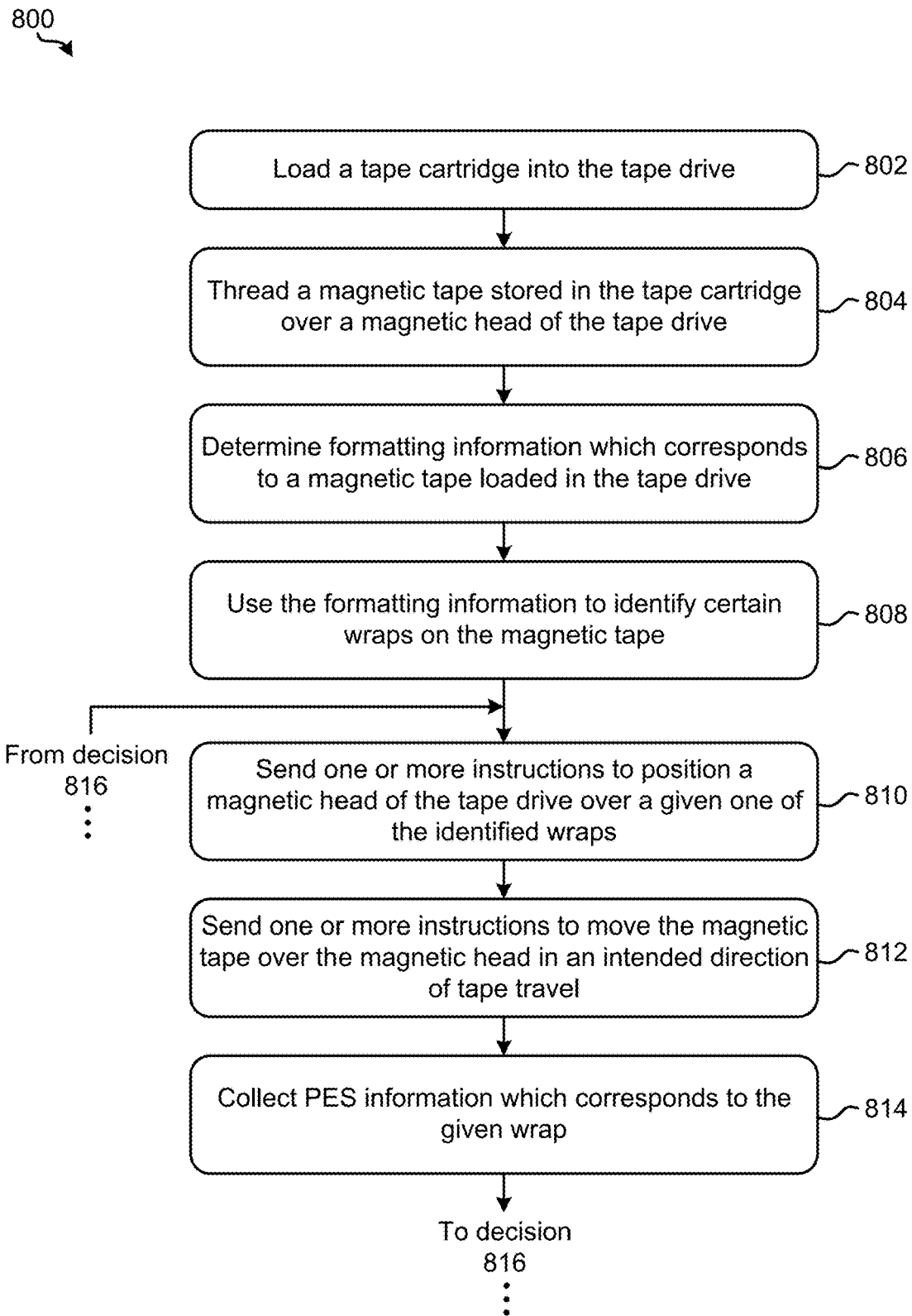
FIG. 8A is a flowchart of a method, according to one embodiment.
Figure 8A:
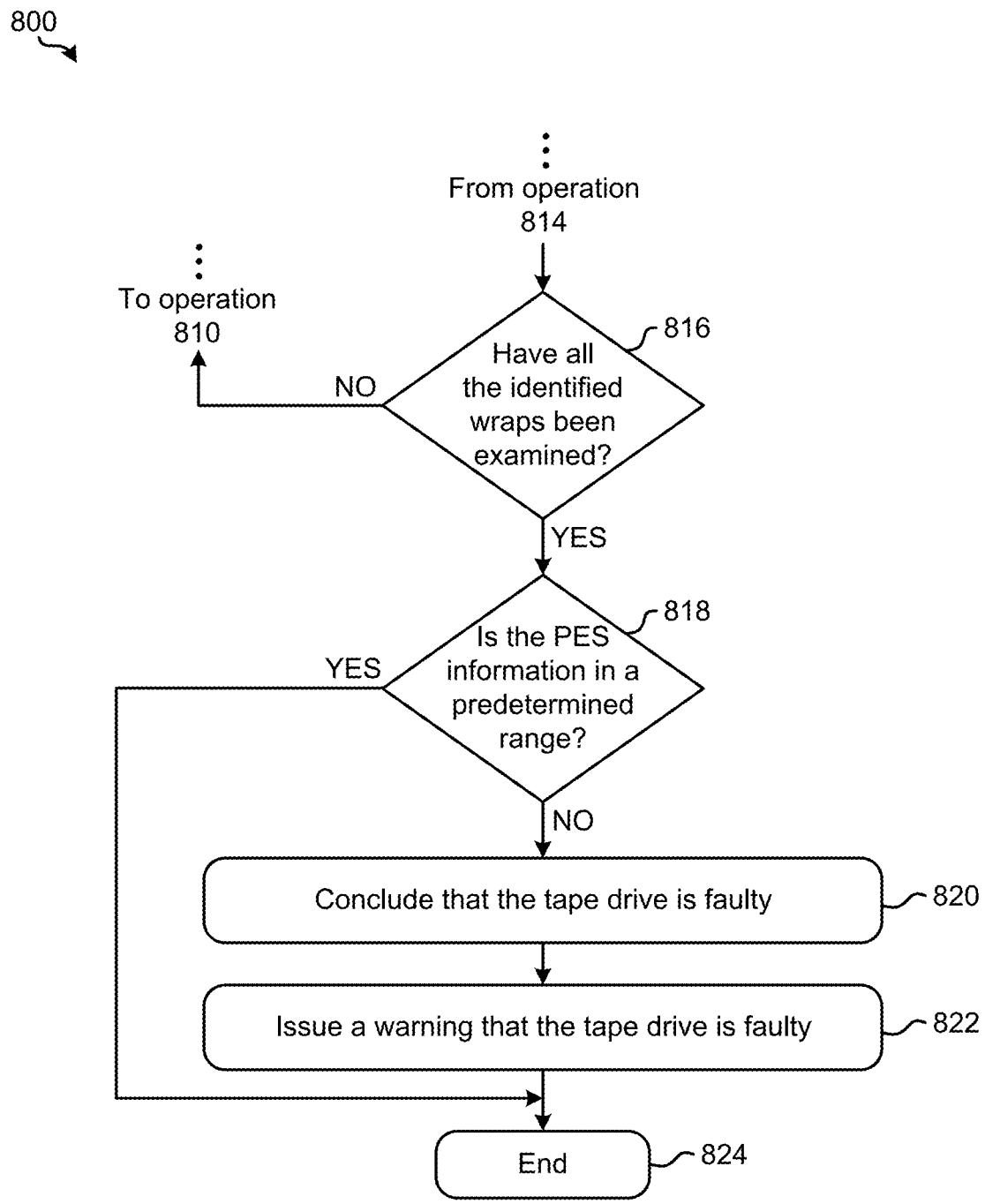

As shown in FIG. 8A, operation 802 of method 800 includes loading a tape cartridge into the tape drive, while operation 804 further includes threading a magnetic tape stored in the tape cartridge over a magnetic head of the tape drive. The tape cartridge can be loaded into the tape drive using any processes which would be apparent to one skilled in the art after reading the present description. For example, the tape cartridge may be loaded into the tape drive using an automated accessor in some approaches. Similarly, the process of threading the magnetic tape in the tape cartridge over the magnetic head may be performed using any procedures and/or components which would be apparent to one skilled in the art after reading the present description.

As alluded to above, some of the embodiments included herein test the performance of tape drives and the components included therein. For example, performance of the guides in a tape drive are tested during the manufacture process thereof before being sent out for consumer use. Specifically, in some approaches the bearings included in the guides are tested for irregularities (e.g., non-uniform performance) which may have a negative effect on performance of the tape drive as a whole. Specifically, guide bearing issues reduce yield, cause line churn, increase PES, etc.

It follows that method 800 is performed during the manufacture process of a tape drive in some approaches. Thus, while the magnetic tape threaded over the magnetic head in operation 804 includes a number of data bands and servo bands specified thereon (e.g., according to a given magnetic tape standard such as LTO), the magnetic tape does not include any actual user data written thereto or otherwise stored thereon. In other words, the magnetic tape is specifically used to test the tape drive itself during the manufacture process thereof in some approaches. It should be noted that with respect to the present description, "user data" is intended to refer to bits of information which are organized in an intentional and meaningful manner. Although the numerous grains of magnetic material on the magnetic tape naturally have a resting state that represents a logical 1 or logical 0, this is not as a result of actually writing data thereto. However, in some approaches a magnetic tape which actually does include user data stored thereon is threaded over the magnetic head in operation 804. For instance, one or more of the processes included in method 800 may be performed at a consumer (e.g., user) location in order to test the performance of a tape drive which has already been implemented.

However, it should also be noted that operations 802 and 804 are in no way intended to limit the invention. For instance, in some approaches a tape cartridge may already be loaded into the tape drive, in which case operation 802 may be skipped over. In other approaches, a magnetic tape may already be threaded over the magnetic head of the tape drive, in which case operation 804 may be skipped over.

With continued reference to FIG. 8A, operation 806 includes determining formatting information which corresponds to a magnetic tape loaded in the tape drive. In other words, operation 806 includes determining a format type of the magnetic tape. As mentioned above, regardless of whether the magnetic tape includes user data stored thereon, a number of data bands and servo bands are specified on the magnetic tape itself according to a given magnetic tape standard, e.g., such as LTO. Various wraps are also specified in each of the data and/or servo bands themselves according to the formatting information, where a given wrap corresponds to a specific orientation of the magnetic head relative to the magnetic tape such that the transducers on the magnetic head align with certain ones of the data tracks on the magnetic tape.

The standard by which the servo and data bands are specified on a magnetic tape, as well as the wraps included therein, is expressed in the formatting information of the magnetic tape. Moreover, the formatting information which corresponds to a given magnetic tape may be stored on the magnetic tape itself, in a cartridge memory, on a label coupled to an exterior of the tape cartridge, etc. As mentioned above, the magnetic tape is stored in a tape cartridge, and the tape cartridge includes additional components in some approaches. For instance, in some approaches the tape cartridge includes a cartridge memory which is separate from the magnetic tape itself (e.g., see nonvolatile memory 156 FIG. 2B above). It follows that determining the formatting information corresponding to the magnetic tape includes accessing the formatting information from a tape cartridge memory in some approaches. In some approaches, the cartridge memory contains the logical position on the beginning and end of each of the data bands as well as the format type of the given magnetic tape.

Moving to operation 808, here method 800 includes using the formatting information to identify certain wraps on the magnetic tape. In order to test the performance of a given tape drive, the magnetic head in the tape drive is positioned over a given wrap of a magnetic tape, and the magnetic tape is run across the magnetic head. As the tape is moving, transducers on the magnetic head collect (e.g., read) information from the magnetic tape and use this information to determine performance characteristics, e.g., such as PES. These performance characteristics are typically derived from servo based information read from the servo tracks on the magnetic tape, e.g., as would be appreciated by one skilled in the art after reading the present description.

While errors in drive performance, e.g., such as line churn caused by faulty guide bearings, are the slightest at or near the center of the magnetic tape along the cross-track direction, these errors are increasingly magnified as the reference point moves closer to the outer extents of the magnetic tape along the cross-track direction. In other words, line churn which is barely noticeable at about the center track may be quite significant at the outer tracks along the cross-track direction. However, the process of positioning a magnetic head above an outermost portion of a magnetic tape along the cross-track direction is much more difficult than positioning the magnetic head above the center (or at least near the center) of the magnetic tape. As a result, previous attempts to test tape drive performance have involved inspecting an entirety of the magnetic tape, beginning at about a center of the magnetic tape and moving outward along the cross-track direction. However, this process takes an immense amount of time to complete even without factoring in error recovery procedures which may be triggered in order to combat guide bearing and/or data track issues.

In an effort to reduce the amount of time spent testing performance of a tape drive, conventional procedures have chosen to forego inspection of the outer edges of the magnetic tape. However, these conventional procedures are unable to effectively assess performance because of this shortcut, thereby resulting in faulty tape drives being certified for use. Over time these faulty tape drives experience increasingly poor performance, which prompts users to replace the magnetic heads therein in an effort to improve performance. However, these replacements do not solve the underlying issue caused by other components in the tape drive itself, thereby resulting in unnecessary maintenance fees and resource consumption before the true issue is discovered.

Figure 8B:
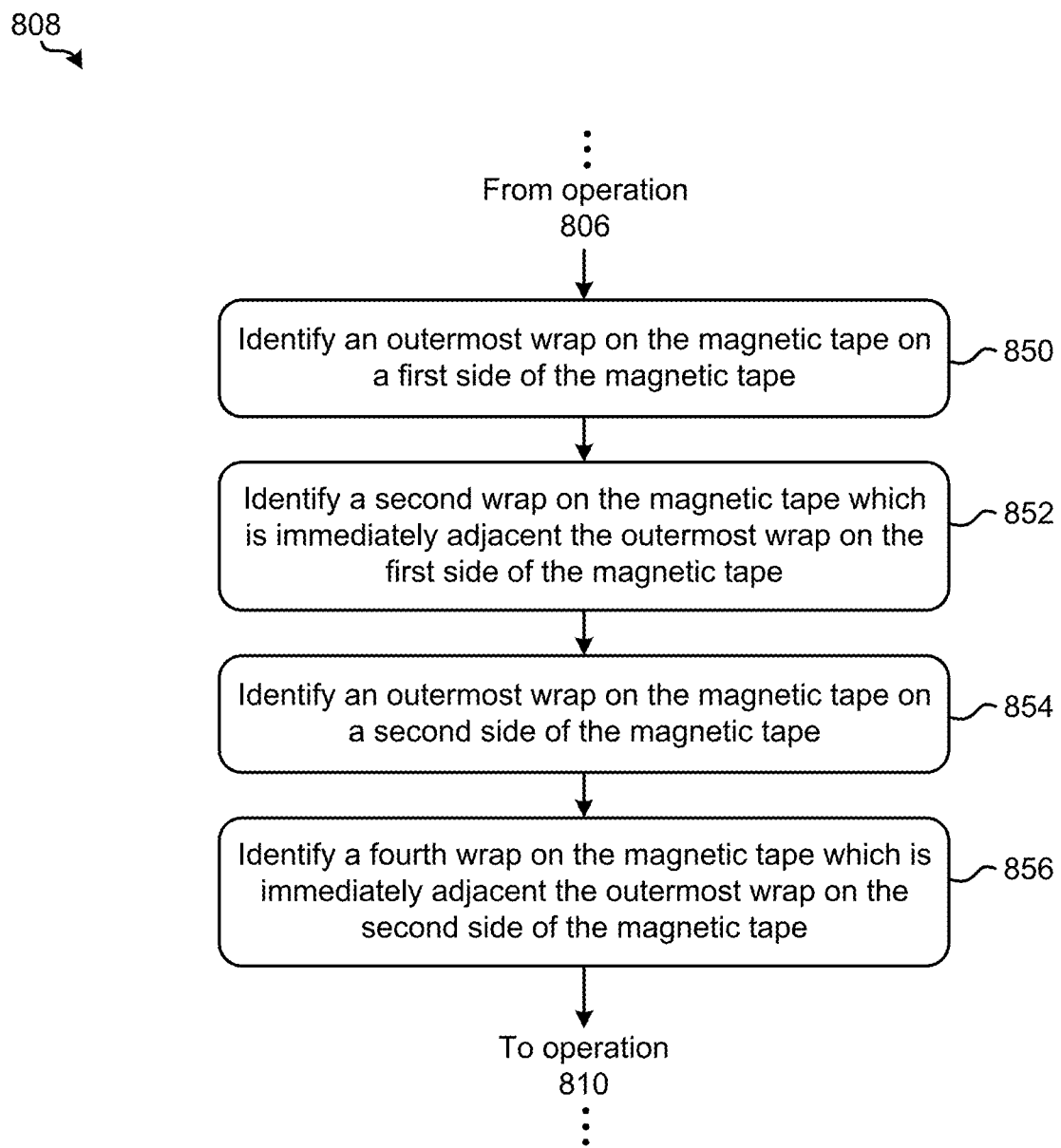
FIG. 8B is a flowchart of sub-processes for one of the operations in the method of FIG. 8A, in accordance with one embodiment.

In sharp contrast, the wraps on the magnetic tape which are identified using the formatting information in operation 808 are preferably at or near the outer extents of the magnetic tape along the cross-track direction. Referring momentarily to FIG. 8B, exemplary sub-processes of identifying certain wraps on a magnetic tape are illustrated in accordance with one embodiment, one or more of which may be used to perform operation 808 of FIG. 8A. However, it should be noted that the sub-processes of FIG. 8B are illustrated in accordance with one embodiment which is in no way intended to limit the invention.

As shown, FIG. 8B includes identifying an outermost wrap on the magnetic tape on a first side of the magnetic tape. See sub-operation 850. Moreover, sub-operation 852 includes identifying a second wrap on the magnetic tape which is immediately adjacent the outermost wrap on the first side of the magnetic tape. In some approaches, the outermost wrap and/or the wrap immediately adjacent thereto may be identified using an offset specified in the formatting information. For example, the formatting information may specify that an outermost wrap of the magnetic tape corresponds to a specific offset from a center wrap of the magnetic tape. Moreover, the wrap immediately adjacent thereto may be identified by applying a minimum lateral shift to a position of the magnetic head with respect to the magnetic tape. However, any processes which would be apparent to one skilled in the art after reading the present description may be implemented in order to identify specific wraps on the magnetic tape using the formatting information.

Moving to sub-operation 854, an outermost wrap on the magnetic tape on a second side of the magnetic tape is identified. The first and second sides of the magnetic tape as used herein are parallel to a longitudinal axis of the magnetic tape and are positioned on opposite sides thereof. In other words, the first and second sides of the magnetic tape are on opposite sides of the magnetic tape relative to each other along the cross-track direction. Sub-operation 856 further includes identifying a fourth wrap on the magnetic tape which is immediately adjacent the outermost wrap on the second side of the magnetic tape.

As mentioned above, any processes which would be apparent to one skilled in the art after reading the present description may be implemented in order to identify specific wraps on the magnetic tape using the formatting information. Moreover, although the flowchart of FIG. 8B specifies identifying four distinct wraps, any desired number of wraps can be identified. For example, which is in no way intended to limit the invention, only the outermost wrap on the first side of the magnetic tape and the outermost wrap on the second side of the magnetic tape may be identified. Yet, according to other examples, six total wraps, eight total wraps, ten total wraps, etc. may be identified, e.g., depending on the desired approach.

Once the desired number of wraps on the magnetic tape have been identified, a procedure is performed for each of the wraps which have been identified. It follows that certain processes may be repeated for each of the identified wraps in an iterative fashion, e.g., as will soon become apparent.

Returning to FIG. 8A, operation 810 includes sending one or more instructions to position a magnetic head of the tape drive over a given one of the identified wraps. Any one of the identified wraps may be examined first, and the identified wraps may be examined according to any desired order. Thus, operation 810 may include sending one or more instructions to position a magnetic head of the tape drive over any desired one of the identified wraps depending on the given approach. According to an example, which is in no way intended to limit the invention, the outermost wrap on the first side of the magnetic tape is evaluated first, followed by the wrap immediately adjacent thereto. This allows for the least amount of time spent transitioning (e.g., moving) between the various wraps, thereby further improving efficiency.

The one or more instructions are sent to a tape drive controller (e.g., see 128 in FIG. 2B above) in some approaches, which may in turn instruct an actuator assembly of the tape drive in some approaches. For instance, a coarse actuator may be used to laterally shift a position of the magnetic head with respect to the magnetic tape along the cross-track direction, after which a fine actuator may be used to fine-tune the position of the magnetic head relative to the magnetic tape.

Moving to operation 812, one or more instructions are sent to move the magnetic tape over the magnetic head in an intended direction of tape travel. Again, the one or more instructions are sent to a tape drive controller (e.g., see 128 in FIG. 2B above) in some approaches, which may in turn instruct a motor to rotate a tape supply cartridge and/or a take-up reel (e.g., see 120 and 121 in FIG. 2B above) such that the magnetic tape is passed over the magnetic head along an intended tape travel direction. It should be noted that the "intended tape travel direction" may actually be one of two directions which are oriented anti-parallel to each other. For instance, the magnetic tape may move from the tape supply cartridge to the take-up reel along the intended tape travel direction in situations where the magnetic head is initially positioned closer to the beginning of tape than the end of tape. Conversely, the magnetic tape may move from the take-up reel to the tape supply cartridge along the intended tape travel direction in situations where the magnetic head is initially positioned closer to the end of tape than the beginning of tape, e.g., as would be appreciated by one skilled in the art after reading the present description.

Method 800 further includes collecting PES information which corresponds to the given wrap. See operation 814. As mentioned above, PES information is collected in some approaches by reading servo information from a servo band using servo transducers, and using that servo information to deduce the actual PES information. Actually, deducing the PES information, e.g., such as PES sigma data, may include any processes which would be apparent to one skilled in the art after reading the present description.

Following operation 814, a determination is made as to whether all of the identified wraps have been examined. See decision 816. In response to determining that all of the identified wraps have not yet been examined, method 800 returns to operation 810 such that the magnetic head is positioned over another one of the identified wraps. As alluded to above, processes 810, 812, 814 and 816 may thereby be repeated in an iterative fashion until each of the identified wraps have been examined and PES information has been collected (e.g., deduced) therefrom.

In response to determining that all of the identified wraps have been examined, method 800 proceeds to decision 818. There, decision 818 includes determining whether the collected PES information is in a predetermined range. In other words, decision 818 includes determining whether the PES information is acceptable or not. It should be noted that "in a predetermined range" is in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach. Moreover, the range may be predetermined by a user, according to industry standards, by the tape drive vendor, customer preferences, etc.

In response to determining that the collected PES information is in the predetermined range, the flowchart jumps to operation 824, whereby method 800 may end. However, it should be noted that although method 800 may end upon reaching operation 824, any one or more of the processes included in method 800 may be repeated in order to retest the tape drive and/or a different tape drive. In other words, any one or more of the processes included in method 800 may be repeated for additional testing.

However, returning to decision 818, method 800 proceeds to operation 820 in response to determining that the collected PES information is not in the predetermined range. There, operation 820 includes concluding that the tape drive is faulty. In other words, operation 820 includes determining that the tape drive is not able to perform according to a set of standards due to some faults therein. The PES information can be used in some approaches to determine at least some information about what is causing the tape drive to perform poorly. For example, the PES information may be used in some approaches to conclude that the one or more guide bearings in the tape drive are faulty, thereby causing line churn and/or other undesirable conditions.

Operation 822 further includes issuing a warning that the tape drive is faulty. In some approaches the warning includes the PES information and a corresponding cause thereof. For example, the warning issued in operation 822 includes the PES information and a deduction that the PES information was caused by one or more faulty guide bearings. The warning also suggests a course of action which may be used to alleviate the issue in some approaches. For example, the warning may provide a customer service number to contact, a list of components in the tape drive to replace, additional tests to conduct, etc.

By examining the PES which corresponds to the outer wraps of a magnetic tape, method 800 is able to effectively identify tape drive faults, e.g., such as poor guide bearings. Customer simulated operations are thereby able to focus on data channel quality and situations involving line churn caused by faulty guide bearings are avoided. As mentioned above, PES information is collected from the outer edge wraps of a magnetic tape where guide bearing quality and roller skew and/or pitch influences are maximized, thereby providing more accurate performance data in a fraction of the time compared to conventional implementations.

It follows that the embodiments included herein are able to efficiently identify faulty components in a tape drive, assist in repairing and/or replacing the one or more faulty components, and ensure desirable performance of the tape drive as a whole. Accordingly, some of the embodiments included herein are able to ensure guide bearing functionality which significantly improves yield, improves product quality, reduces testing time, etc., while also improving the quality of tape drives which are manufactured, thereby desirably protecting consumers (e.g., users).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
    determining formatting information which corresponds to a magnetic tape loaded in the tape drive;

using the formatting information to identify wraps on the magnetic tape, wherein identifying wraps on the magnetic tape includes:
  identifying an outermost wrap on the magnetic tape on a first side of the magnetic tape, and
  identifying an outermost wrap on the magnetic tape on a second side of the magnetic tape; and
performing a procedure for each of the wraps identified using the formatting information, wherein performing the procedure for a given one of the wraps includes:
  sending one or more instructions to position a magnetic head of the tape drive over the given wrap,
  sending one or more instructions to move the magnetic tape over the magnetic head, and
  collecting position error signal (PES) information which corresponds to the given wrap.

2. The tape drive-implemented method as recited in claim 1, wherein identifying wraps on the magnetic tape includes:
  identifying a second wrap on the magnetic tape which is immediately adjacent the outermost wrap on the first side of the magnetic tape, and
  identifying a fourth wrap on the magnetic tape which is immediately adjacent the outermost wrap on the second side of the magnetic tape.

3. The tape drive-implemented method as recited in claim 1, wherein the first and second sides of the magnetic tape are parallel to a longitudinal axis of the magnetic tape.

4. The tape drive-implemented method as recited in claim 1, wherein the magnetic tape is formatted according to a linear tape open format.

5. The tape drive-implemented method as recited in claim 1, comprising:
  determining whether the collected PES information is in a predetermined range; and
  in response to determining that the collected PES information is not in the predetermined range, concluding that one or more guide bearings in the tape drive are faulty.

6. The tape drive-implemented method as recited in claim 1, wherein the magnetic tape is stored in a tape cartridge, wherein determining the formatting information which corresponds to the magnetic tape includes accessing the formatting information from a tape cartridge memory.

7. The tape drive-implemented method as recited in claim 1, with a proviso that the magnetic tape does not have any user data stored thereon.

8. A computer program product comprising a computer readable storage medium having program instructions embodied therewith, wherein the computer readable storage medium is not a transitory signal per se, the program instructions readable and/or executable by a processor to cause the processor to perform a method comprising:
  determining, by the processor, formatting information which corresponds to a magnetic tape loaded in a tape drive;
  using, by the processor, the formatting information to identify wraps on the magnetic tape, wherein identifying wraps on the magnetic tape includes:
    identifying an outermost wrap on the magnetic tape on a first side of the magnetic tape, and
    identifying an outermost wrap on the magnetic tape on a second side of the magnetic tape; and
  performing, by the processor, a procedure for each of the wraps identified using the formatting information, wherein performing the procedure for a given one of the wraps includes:
    sending one or more instructions to position a magnetic head of the tape drive over the given wrap,
    sending one or more instructions to move the magnetic tape over the magnetic head, and
    collecting position error signal (PES) information which corresponds to the given wrap.

9. The computer program product as recited in claim 8, wherein identifying wraps on the magnetic tape includes:
  identifying a second wrap on the magnetic tape which is immediately adjacent the outermost wrap on the first side of the magnetic tape, and
  identifying a fourth wrap on the magnetic tape which is immediately adjacent the outermost wrap on the second side of the magnetic tape.

10. The computer program product as recited in claim 8, wherein the first and second sides of the magnetic tape are parallel to a longitudinal axis of the magnetic tape.

11. The computer program product as recited in claim 8, wherein the magnetic tape is formatted according to a linear tape open format.

12. The computer program product as recited in claim 8, the program instructions readable and/or executable by the processor to cause the processor to perform the method comprising:
  determining, by the processor, whether the collected PES information is in a predetermined range; and
  in response to determining that the collected PES information is not in the predetermined range, concluding, by the processor, that one or more guide bearings in the tape drive are faulty.

13. The computer program product as recited in claim 8, wherein the magnetic tape is stored in a tape cartridge, wherein determining the formatting information which corresponds to the magnetic tape includes accessing the formatting information from a tape cartridge memory.

14. The computer program product as recited in claim 8, with a proviso that the magnetic tape does not have any user data stored thereon.

15. A system, comprising:
  a processor; and
  logic integrated with and/or executable by the processor, the logic being configured to cause the processor to:
    determine, by the processor, formatting information which corresponds to a magnetic tape loaded in a tape drive;
    use, by the processor, the formatting information to identify wraps on the magnetic tape, wherein identifying wraps on the magnetic tape includes:
      identifying an outermost wrap on the magnetic tape on a first side of the magnetic tape, and
      identifying an outermost wrap on the magnetic tape on a second side of the magnetic tape; and
    perform, by the processor, a procedure for each of the wraps identified using the formatting information, wherein performing the procedure for a given one of the wraps includes:
      sending one or more instructions to position a magnetic head of the tape drive over the given wrap,
      sending one or more instructions to move the magnetic tape over the magnetic head, and
      collecting position error signal (PES) information which corresponds to the given wrap.

16. The system as recited in claim 15, wherein identifying wraps on the magnetic tape includes:
  identifying a second wrap on the magnetic tape which is immediately adjacent the outermost wrap on the first side of the magnetic tape, and identifying a fourth wrap on the magnetic tape which is immediately adjacent the outermost wrap on the second side of the magnetic tape.

17. The system as recited in claim 15, wherein the first and second sides of the magnetic tape are parallel to a longitudinal axis of the magnetic tape.

18. The system as recited in claim 15, wherein the magnetic tape is formatted according to a linear tape open format.

19. The system as recited in claim 15, the logic being configured to cause the processor to:
   determine, by the processor, whether the collected PES information is in a predetermined range; and
   in response to determining that the collected PES information is not in the predetermined range, conclude, by the processor, that one or more guide bearings in the tape drive are faulty.

20. The system as recited in claim 15, with a proviso that the magnetic tape does not have any user data stored thereon, wherein the magnetic tape is stored in a tape cartridge, wherein determining the formatting information which corresponds to the magnetic tape includes accessing the formatting information from a tape cartridge memory.

* * * * *